United States Patent [19]

Kitagawa

[11] 4,162,134
[45] Jul. 24, 1979

[54] APPARATUS FOR ADJUSTING VERTICAL POSITION OF DRILLS IN MULTIPLE SPINDLE DRILLING MACHINE

[75] Inventor: Toshikatsu Kitagawa, Seki, Japan
[73] Assignee: Miyakawa Industry Company Limited, Seki, Japan
[21] Appl. No.: 869,016
[22] Filed: Jan. 12, 1978
[51] Int. Cl.² .................. B23B 39/18; B23B 39/16
[52] U.S. Cl. .................................. 408/46; 408/42; 408/53
[58] Field of Search ............ 408/13, 42, 43, 46, 408/48, 52, 53

[56] References Cited

U.S. PATENT DOCUMENTS

| | | | |
|---|---|---|---|
| 1,465,591 | 8/1923 | Seavey | 408/46 |
| 2,636,525 | 4/1953 | Anguera | 408/46 X |
| 3,127,661 | 4/1964 | McConnell | 408/46 X |
| 3,730,635 | 5/1973 | Orendi | 408/13 X |
| 3,749,507 | 7/1973 | Haley | 408/53 X |
| 3,977,804 | 8/1976 | Kitagawa | 408/42 X |
| 4,030,853 | 6/1977 | Mizen | 408/52 X |

Primary Examiner—Harrison L. Hinson
Attorney, Agent, or Firm—George B. Oujevolk

[57] ABSTRACT

An apparatus for adjusting the vertical position of drills in a multiple spindle drilling machine comprising drills attached in upper and lower two lateral rows to a gear box of the multiple spindle drilling machine, said two groups of the drills being arranged so that the drills of the respective groups can be simultaneously moved in the vertical direction, a motor for driving and rotating the two groups of the drills, a moving device disposed to connect said two groups of the drills so that they are moved in the vertical direction according to the height of drilling positions of a material to be processed, and a positioning device attached to the gear box to regulate the vertical movement of the drills of the respective groups within a certain range and set the vertical position thereof.

8 Claims, 11 Drawing Figures

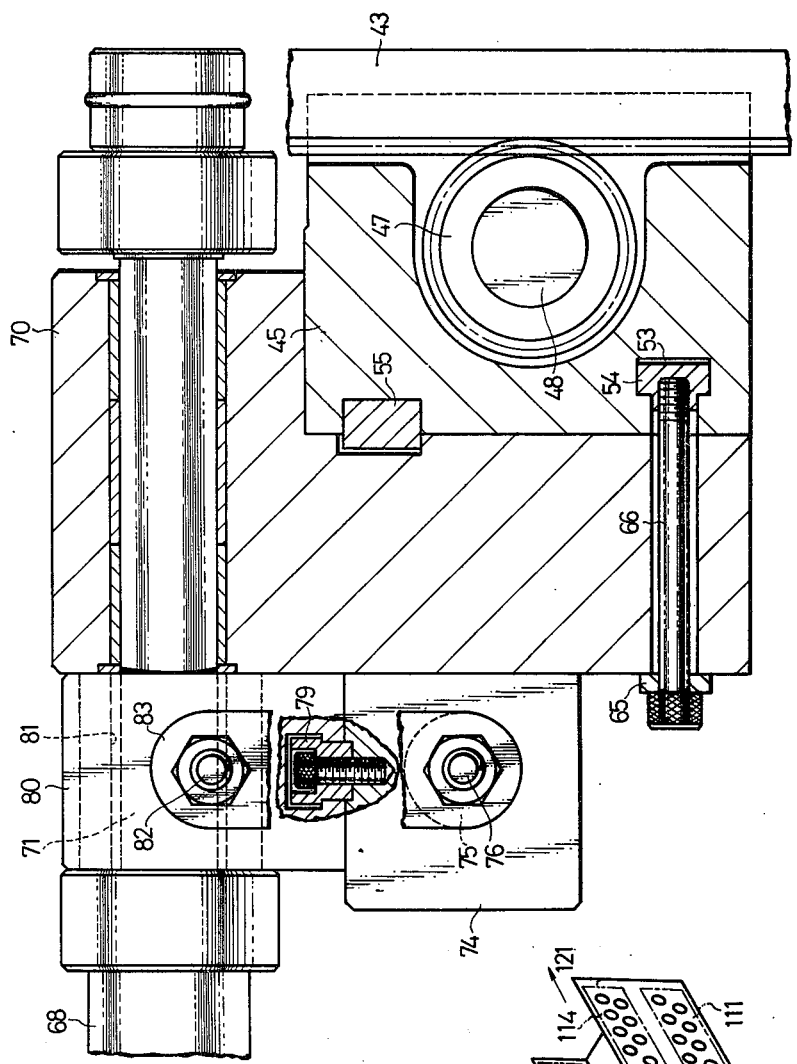
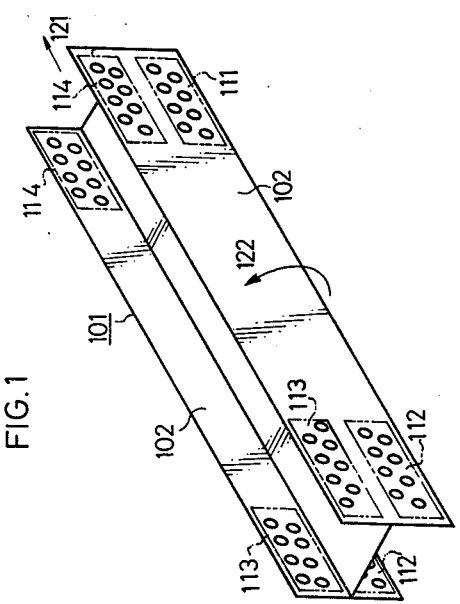

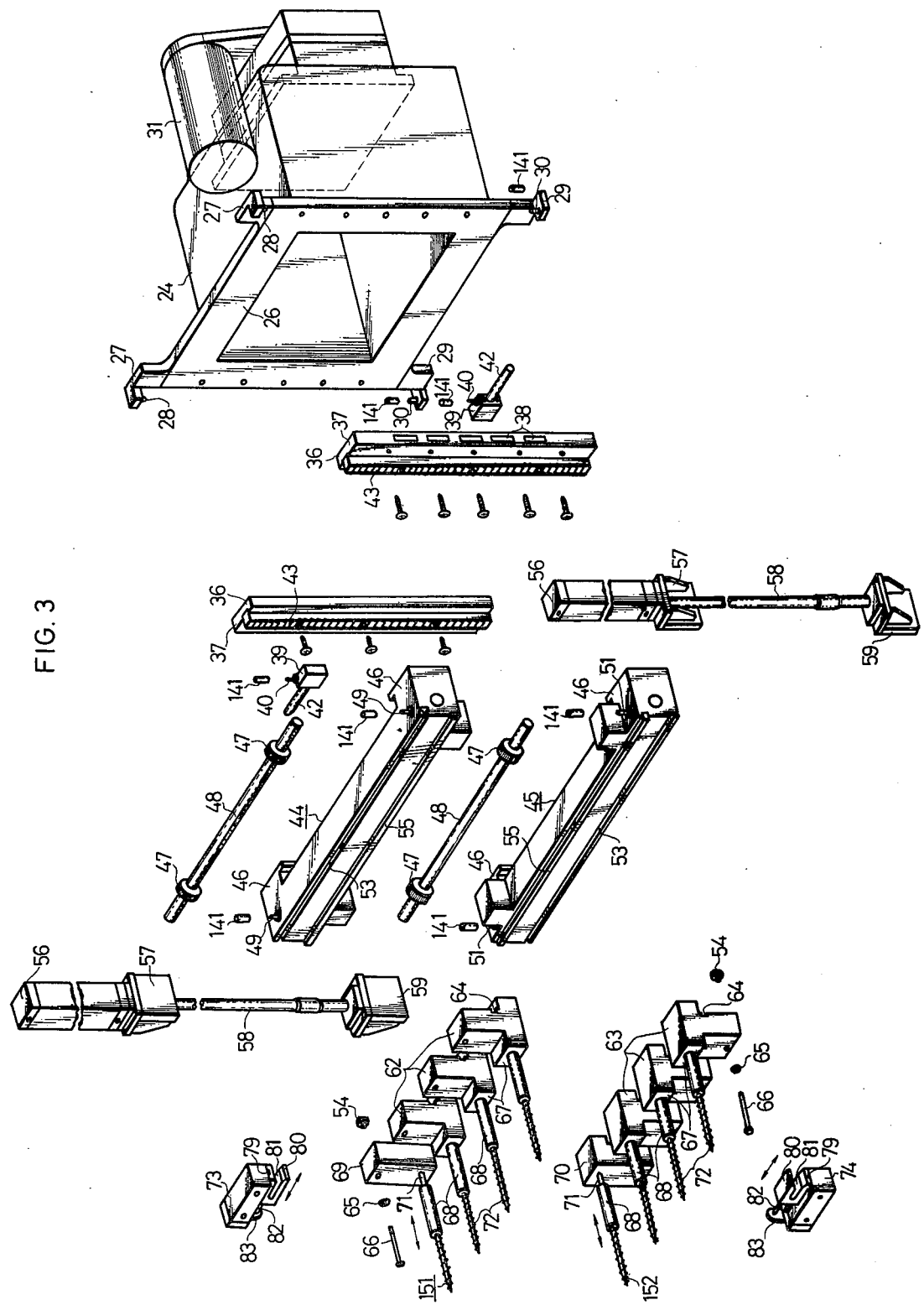

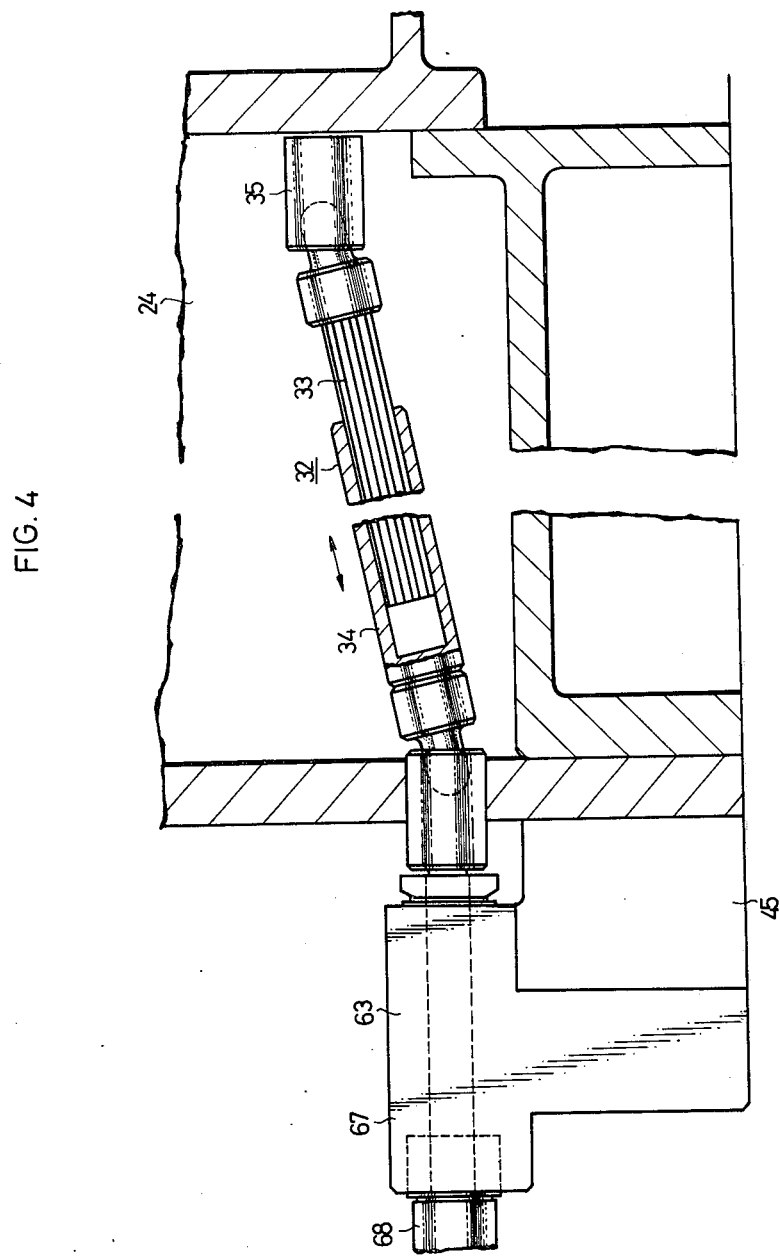

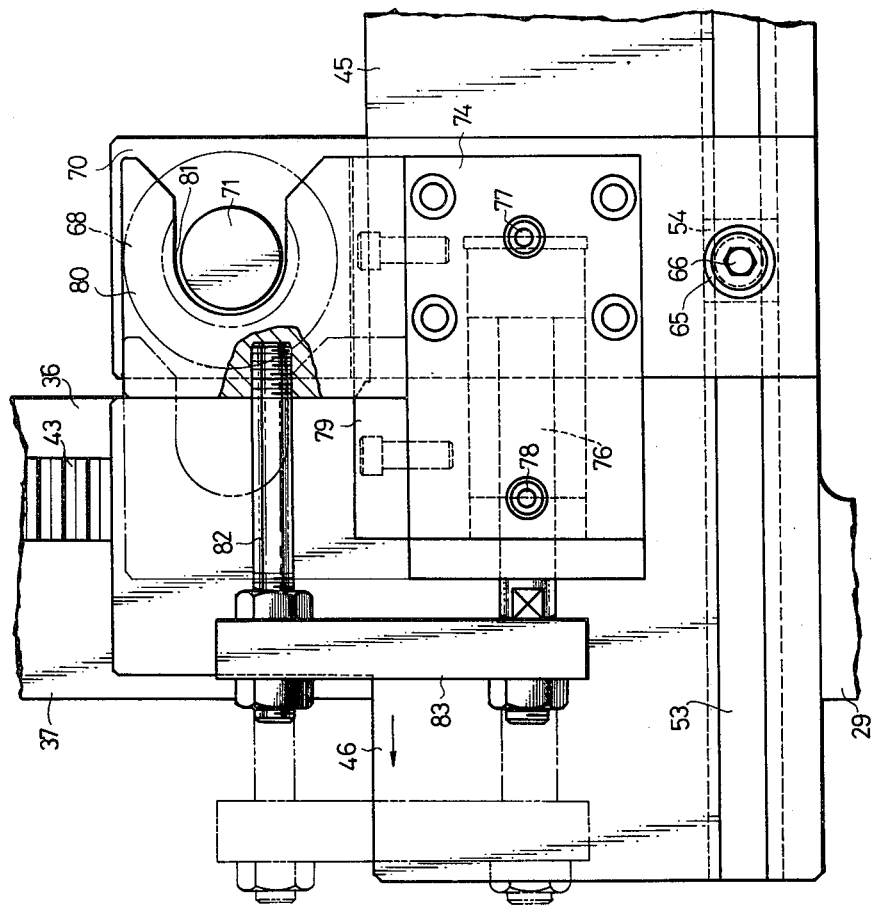
FIG. 8
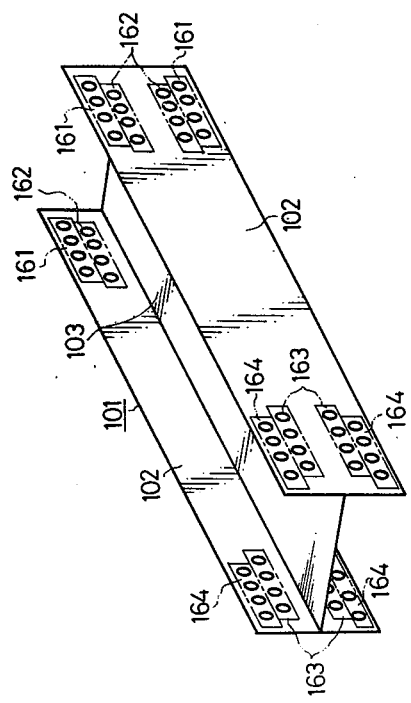
FIG. 9(a)
FIG. 9(b)

1

APPARATUS FOR ADJUSTING VERTICAL POSITION OF DRILLS IN MULTIPLE SPINDLE DRILLING MACHINE

BACKGROUND OF THE INVENTION (1) Field of the Invention

The present invention relates to an apparatus for adjusting the vertical position of drills in a multiple spindle drilling machine for wide flange steel beams or the like.

(2) Description of the Prior Art

When both the front and rear ends of a flange 102 of a wide flange steel beam 101 are drilled as shown in FIG. 1 according to the conventional method, upper and lower two rows of drills located on both the left and right sides of the beam 101 are similarly shifted to some extent in the front-rear direction and the portion 111 is first drilled from both the sides. Then, the beam 101 is shifted backward (in the direction indicated by an arrow 121) and the two rows of the drills are slightly shifted in a direction reverse to the above shifting direction and the portion 112 is drilled from the left and right. Then, the beam 101 is turned in the direction indicated by an arrow 122 and the portion 113 is drilled. Then, the beam 101 is shifted forward and the drills are shifted as in the case of drilling of the portion 111, and finally, the portion 114 is drilled.

According to this conventional method, shifting of the drills in the front-rear direction should be conducted three times and turning of the wide flange steel beam 101 should be conducted once. The forward and backward shifting of the drill groups is especially troublesome. This is a fatal defect involved in the conventional methods.

OBJECTS OF THE INVENTION

It is a primary object of the invention to provide an apparatus for adjusting the vertical position of drills in a multiple spindle drilling machine, by which the vertical position of drills arranged in upper and lower two rows in the multiple spindle drilling machine can be adjusted simply and precisely.

Another object of the present invention is to provide an apparatus for adjusting the vertical position of drills in a multiple spindle drilling machine, by which the vertical position of drills arranged in upper and lower two rows in the multiple spindle drilling machine can optionally be adjusted with ease.

Still another object of the present invention is to provide an apparatus for adjusting the vertical position of drills in a multiple spindle drilling machine, by which at the vertical movement of drills arranged in upper and lower two rows, both the end portions of the drills of the respective groups are shifted synchronously with each another and the drills of the respective groups are prevented from inclining with respect to the vertical direction.

Other objects and advantages will be apparent from the following detailed description of embodiments and the appended claims. Many advantages not specifically mentioned in the specification will become apparent to those skilled in the art when the present invention is practically worked.

BRIEF DESCRIPTION OF THE DRAWING

FIG. 1 is a perspective view showing diagrammatically the drilling positions in a wide flange steel beam.

FIG. 3 is a perspective view showing the apparatus of the present invention in the disassembled state.

FIG. 4 is an enlarged partial view showing in section the state of attachment of a universal joint.

FIG. 7 is an enlarged partial view showing the state of attachment of holding members to the lower movable member.

FIG. 8 is an enlarged partial side view showing the operation state of an attachment member.

FIG. 9(a) is a perspective view showing diagrammatically the drilling positions in a wide flange steel beam.

FIG. 9(b) is a partial perspective view showing the drilling positions in a wide flange steel beam.

DETAILED DESCRIPTION OF THE PREFERRED EMBODIMENTS

Figure 2:
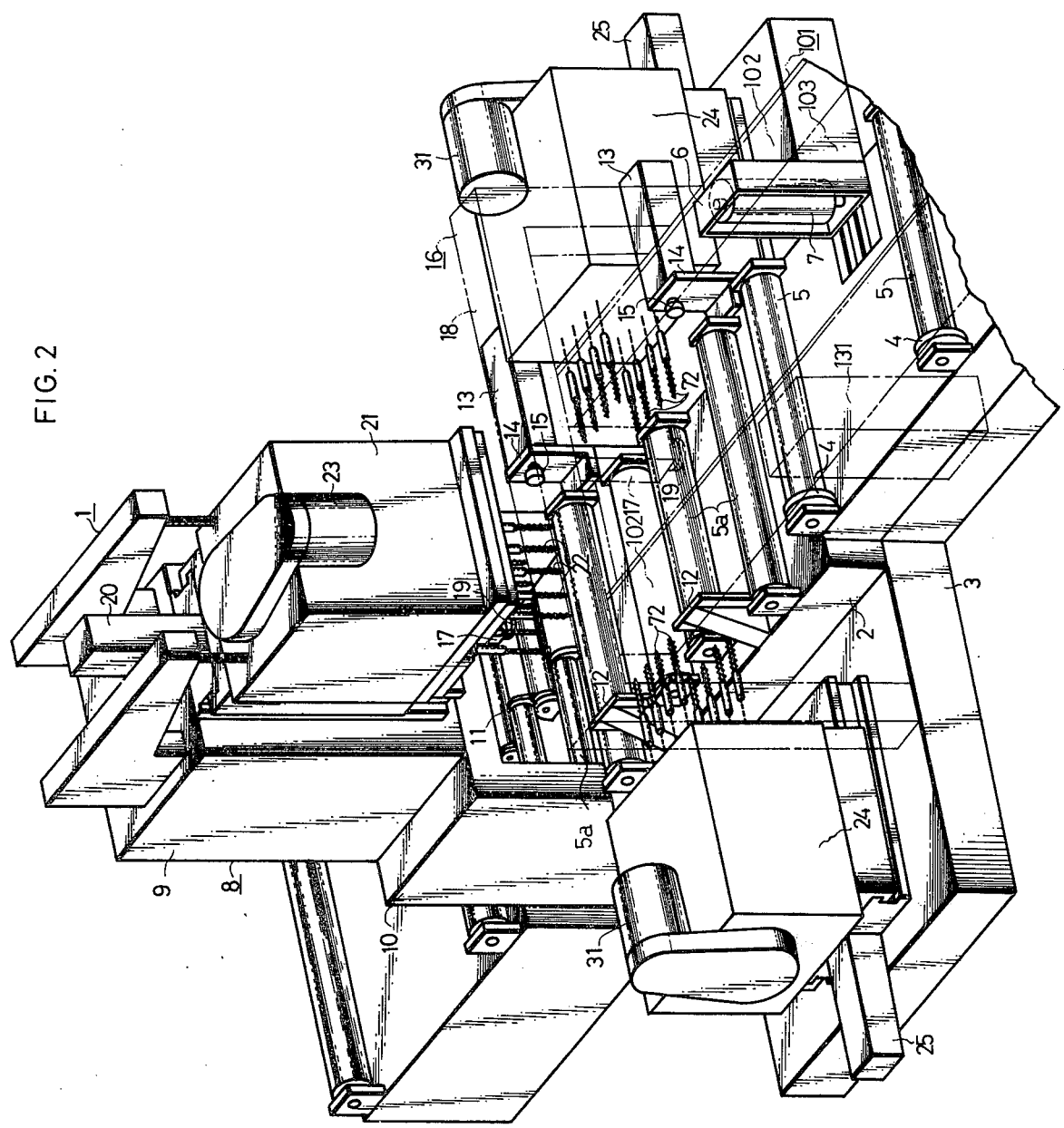
FIG. 2 is a partially cut-out perspective view showing diagrammatically a multiple spindle drilling machine for wide flange steel beams, which is provided with the apparatus for adjusting the vertical position of drills according to the present invention.

An embodiment in which the apparatus of the present invention is applied to a multiple spindle drilling machine for wide flange steel beams will now be described by reference to FIG. 2 and other FIGS.

Reference numeral 1 represents a multiple spindle drilling machine for wide flange steel beams, which is provided with the apparatus for adjusting the vertical position of drills according to the present invention. A machine stand 2 is mounted on a bed 3, and a plurality of supporting rollers 5, each having a guiding bulged portion 4 projected from the periphery at the left end, are freely rotatably attached to the top face of the machine stand 2. These supporting rollers 5 are arranged so that a wide flange steel beam 101 having a pair of parallel flanges 102 and a web 103 connecting the central portions of the flanges 102 to each other can be horizontally supported as indicated by two-dot chain lines.

An attachment frame 6 is vertically disposed on the right side of the top face of the machine stand 2 so that the frame 6 can be moved to the left and right to adjust the position thereof, and a guide roller 7 is vertically attached in the interior of the attachment frame 6 freely rotatably. This guide roller 7 is arranged so that it cooperates with the bulged portion 4 of the supporting roller 5 to guide the wide flange steel beam 101 on the rollers 5.

A supporting frame 8 including an upper frame 9 and a lower frame 10 is vertically disposed on the top face of the rear part of the bed 3, and a passage hole 11 piercing in the front-rear direction and allowing passage of the wide flange steel beam 101 is formed in the lower frame 10. A plurality of auxiliary delivery rollers 5a are freely rotatably attached to the bottom face of the passage hole 11 at the same height as that of the supporting rollers 5.

A pair of front and rear regulating members 12 are vertically fixed on the left end of the machine stand 2 in front of the passage hole 11 of the lower frame 10, and a pair of front and rear cylinder devices 13 corresponding to said regulating members 12 are mounted through attachment plates 14 on the right end of the machine stand 2. A pressing member 15 is attached to the top end of a rod of each cylinder device 13 to press and fix the right flange 102 of the wide flange steel beam 102 supported on the supporting rollers 5 and auxiliary delivery rollers 5a.

A front gate-shaped attachment frame 16 is disposed to stride over the machine stand 2 in the front portion of the bed 3, and a pair of cylinder devices 17 are mounted on the lower face of a lateral frame 18 of the attachment frame 16 and the lower frame 10, respectively, so that they can be moved to the left and right to adjust their positions. A pressing member 19 similar to the above-mentioned pressing member 15 is attached to the top end of a rod of each cylinder device 17 to press and fix the top face of the central portion of the web 103 of the wide flange steel beam 101.

A cylinder device 20 is attached to the upper part of the front face of the upper frame 9 of the supporting frame 8 so that it can be moved in the vertical direction on a gear box 21 mounted on the front face of the upper frame 9. A plurality of drills 22 are dismountably attached to the lower face of the gear box 21 so that attachment positions thereof can be adjusted, and these drills 22 are simultaneously driven and rotated through the gear box 21 by a motor 23 fixed to the front face of the gear box 21.

A pair of gear boxes 24 corresponding to the above-mentioned gear box 21 are disposed on both the left and right sides of the machine stand 2, and each gear box 24 can be moved to the left and right by a cylinder device 25 attached to the lower part of the outer side of the gear box 24. A delivery device 131 is mounted on the front part of the left side of the machine stand 2 to move the wide flange steel beam 101 in the front-rear direction.

As shown in FIG. 3, each of the above-mentioned gear boxes 24 (only the right gear box is shown) has a flange 26 projected from the inner face, and a pair of upper stoppers 27 are mounted on the front and rear parts of the top end of the flange 26 to project forwardly on the left side and backwardly on the left side, respectively. A stopper piece 28 is projected on the lower face at the top end of each upper stopper 27. A pair of lower stoppers 29 similar to the upper stoppers 27 are mounted on the front and rear parts of the lower end of the flange 26, and a pair of stopper pieces 30 corresponding to the stopper pieces 28 of the upper stoppers 27 are projected on the top faces at the top ends of the stoppers 29.

A motor 31 is fixed to the top face of the gear box 24, and as shown in FIG. 4, a plurality of universal joints 32 (one joint alone is shown) for inserting a spline shaft 33 into a spline sleeve 34 so that the shaft 33 can slide to the left and right are disposed so that in each joint 32, the base end of the spline shaft 33 can be moved obliquely with respect to the vertical direction and the left-right direction on the top end of a driving shaft 35 driven by the above-mentioned motor 31.

The apparatus for adjusting the vertical position of drills according to the present invention will now be described.

Figure 5A:
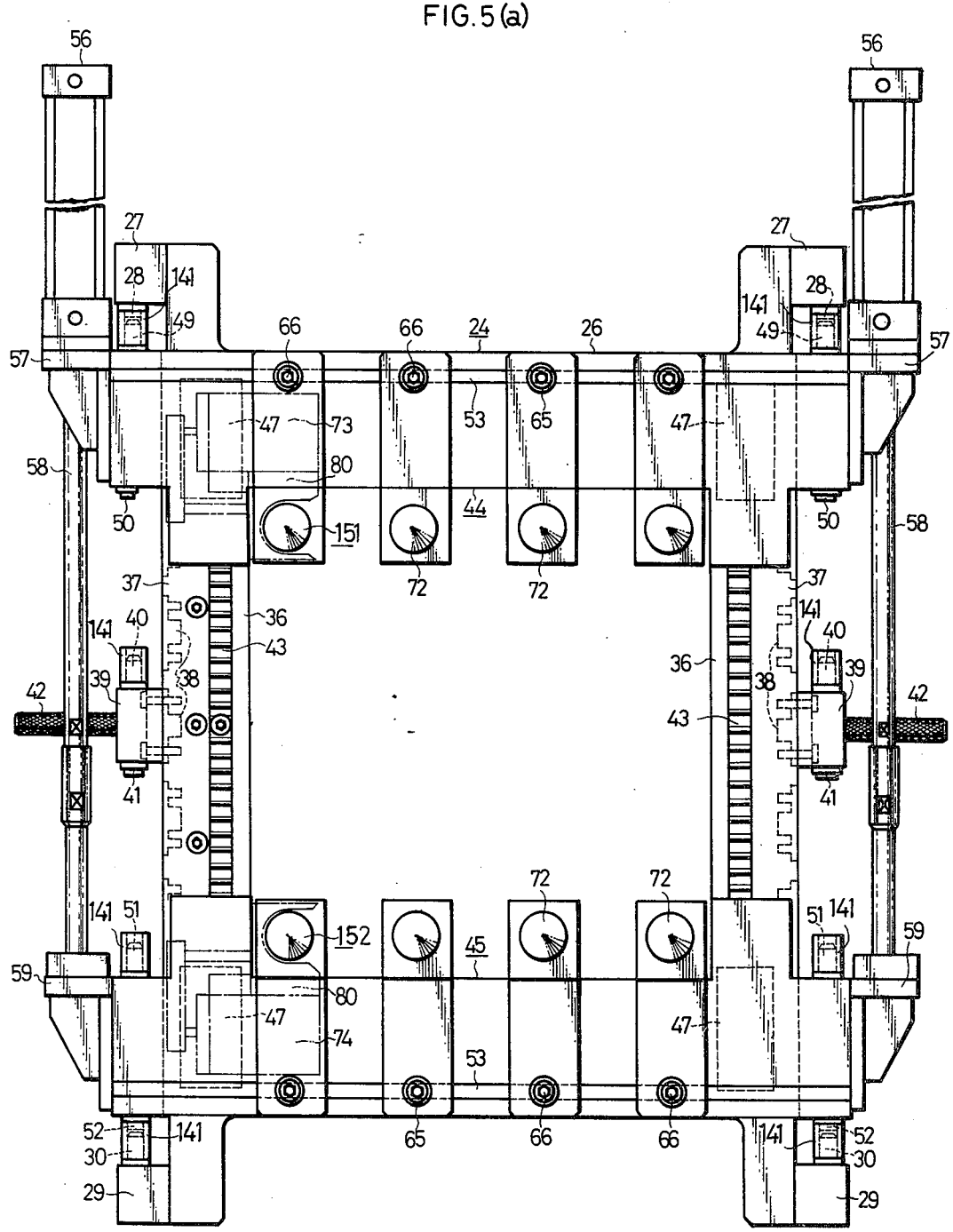
FIG. 5(a) is an enlarged side view showing the state where upper and lower movable members attached to a gear box are spaced from each other.
Figure 5:
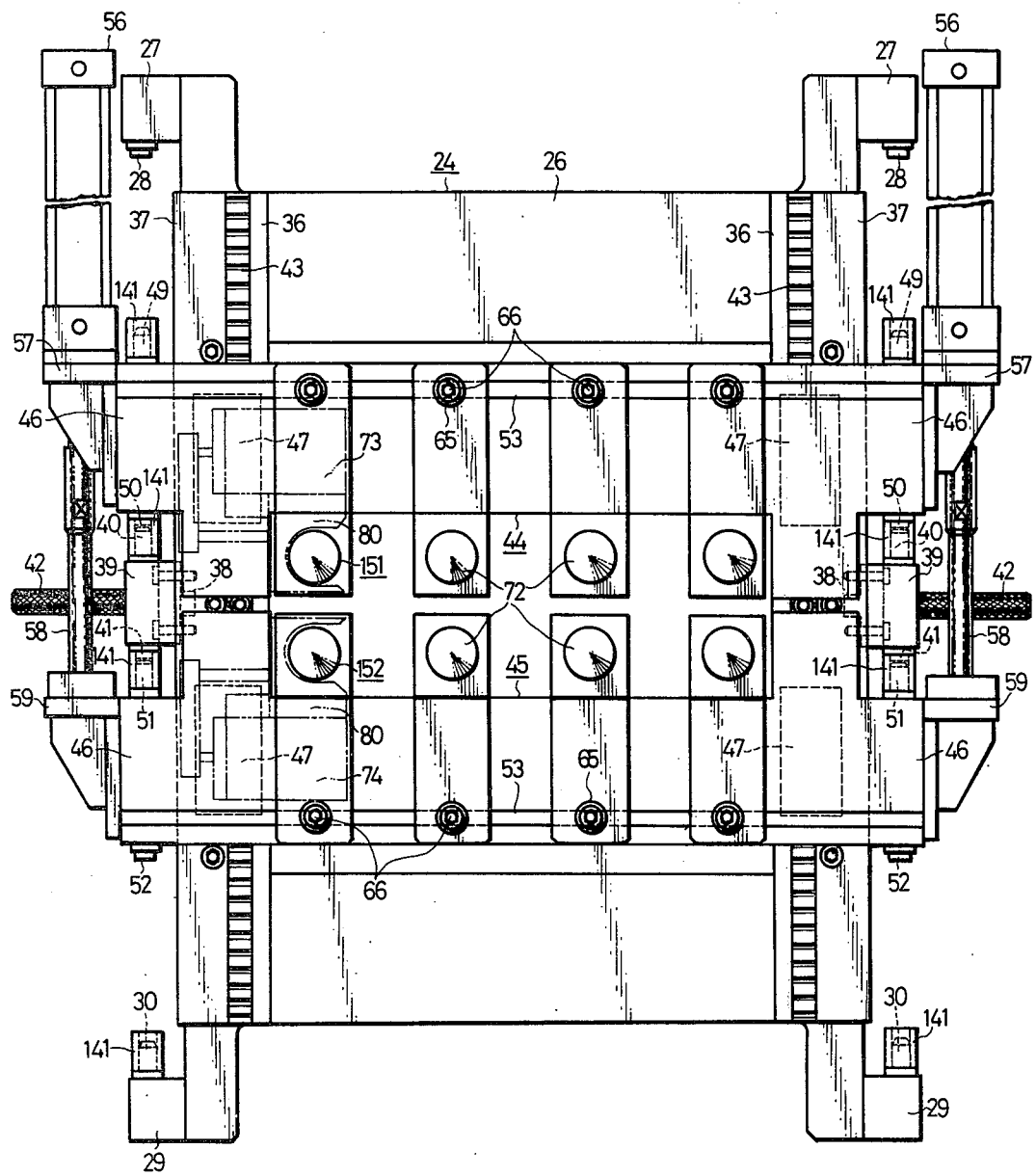
FIG. 5(b) is an enlarged side view showing the state where the movable members shown in FIG. 5(a) are brought close to each other.
Figure 6:
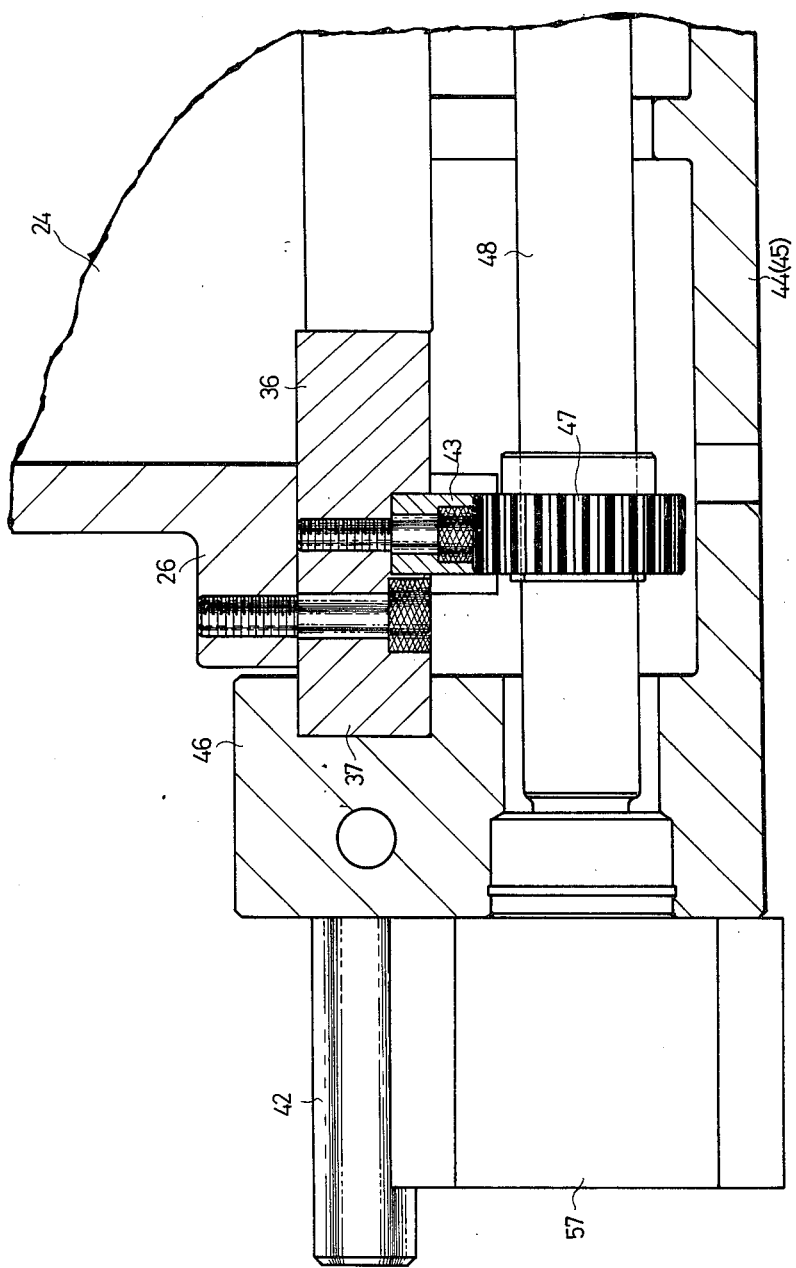
FIG. 6 is an enlarged partial view showing in section the engagement between a guide member and a movable member.

As shown in FIGS. 3, 5 and 6, a pair of guide members 36 extending in the longitudinal direction are attached to the front and rear ends of the flange 26 of the gear box 24, and the front and rear sides of each guide member 36 are slightly projected from the front and rear sides of the flange 26, respectively, to form projected guide portions 37. A plurality of attachment holes 38 are formed on the guide face of each guide portion 37 at positions corresponding to one another, and a positioning member 39 is dismountably attached into an optional pair of the corresponding attachment holes 38. Pairs of stopper pieces 40 and 41 corresponding to a pair of stopper pieces 28 of the upper stopper 27 and a pair of stopper pieces 30 of the lower stopper 29, respectively, are projected from the top and lower faces of the respective positioning members 39. A handle 42 is disposed to shift the positioning member 39.

A pair of racks 43 are attached to the inner face of said pair of the guide members 36 to extend in the longitudinal direction, and as shown in FIG. 6, a pair of upper and lower movable members 44 and 45 are vertically movably attached to the inner face of the gear box 24 so that slide parts 46 on both the ends of each movable member falls in sliding contact with the guide portions 37 of the pair of guide members 36, respectively. Each movable member includes therein a rotary shaft 48 having on both the ends thereof pinion gears 47 to be engaged with said pair of racks 43, respectively. Pairs of stopper pieces 49 and 50 are disposed on the front and rear ends of the upper and lower faces of the upper movable member 44, respectively, at positions corresponding to the positions of the stopper pieces 28 of the above-mentioned upper stopper 27, and pairs of stopper pieces 51 and 52 are disposed on the front and rear ends of the upper and lower faces of the lower movable member 45, respectively, at positions corresponding to the positions of the stopper pieces 30 of the above-mentioned lower stopper 29. Sleeve liners 141 differing in the length are disposed to cover the stopper pieces 30 of the lower stopper 29, the stopper pieces 49 of the upper movable member 44, the stopper pieces 51 of the lower movable member 45 and the stopper pieces 40 of the positioning member 39. As shown in FIGS. 3 and 7, anchoring grooves 53 having a T-shaped section and extending in the lengthwise direction are formed on the upper part of the inner face of the upper movable member 44 and on the lower part of the inner face of the lower movable member 45, respectively, and in the interior of each groove 53, a plurality of nuts 54 (one nut alone is shown) are disposed so that they can be moved in the front-rear direction to adjust the positions thereof. Keys 55 are projected in the lengthwise direction from the lower part of the inner face of the upper movable member 44 and from the upper part of the inner face of the lower movable member 45, respectively.

A pair of hydraulic cylinders 56 are attached in the longitudinal direction to both the front and rear ends of the upper movable member 44, respectively, through brackets 57, and the lower ends of rods 58 of the cylinders 56 are fixed to both the front and rear ends of the lower movable member 45, respectively, through brackets 59.

A plurality of holding members 62 and 63 are attached to the inner faces of the upper and lower movable members 44 and 45 so that their positions can be adjusted in the front-rear direction. The key 55 on the inner face of the upper or lower movable member 44 or 45 is engaged in a key groove 64 on the outer side face of the holding member 62 or 63 and the top end of a bolt 66 piercing the holding member 62 or 63 from the upper and lower ends thereof through a washer 65 is screwed in the nut 54 in the anchoring groove 53 of the upper or lower movable member 44 or 45. A bulged part 67 is projected from the inside of the lower or upper end of each of the holding members 62 and 63 to rotatably support a drill chuck 68 connected to the inner end of the spline sleeve 34 in the gear box 24.

Each holding member 69 or 70 free of the bulged part 67 is attached to the rear part of the inner face of each of the upper and lower movable members 44 and 45 so that its position can be adjusted in the front-rear direction. As in case of other holding members, the key 55 of the movable member 44 or 45 is engaged in a key groove 64 of this holding member 69 or 70, and a bolt 66 is pierced through the interior via a washer 65 and the top end of the bolt 66 is screwed in the nut 54 in the anchoring groove 53. A connecting shaft 71 having a diameter smaller than that of a drill chuck 68 described below is supported on the lower or upper end of the holding member 69 or 70 so that it can be immerged into the gear box 24, and the outer end of the connecting shaft 71 is connected to the inner end of spline sleeve 34 in the gear box 24 and the drill chuck 68 is attached to the inner end in the same manner as described above with respect to other holding members 62 and 63.

A plurality of drills 72 are dismountably attached to the drill chucks 68 of the upper and lower movable members 44 and 45 in two rows, namely an upper group 151 of drills and a lower group 152 of drills. The drills of these two groups 151 and 152 are simultaneously driven and rotated through the universal joints 32 by the motor 31 on the gear box 24.

Hydraulic cylinders 73 and 74 are attached above or below the connecting shafts 71 disposed on the inner side faces of the above-mentioned holding members 69 and 70 free of the bulged part 67 as shown in FIGS. 3, 7 and 8, and the top end of a rod 76 of each cylinder is projected backwardly. Guide projections 79 are projected in the front-rear direction on the lower or top faces of the hydraulic cylinders 73 and 74, and an attachment member 80 having a laterally U-shaped side face is disposed so that it can be moved in the front-rear direction along the guide projection 79 and an anchoring concave part 81 for anchoring therein the connecting shaft 71 of the holding member 69 or 70 is formed at the central part of the attachment member 80. The width in the vertical direction of the anchoring concave part 81 is slightly larger than the diameter of the connecting shaft 71 and slightly smaller than the diameter of the drill chuck 68. A supporting lever 82 is projected from the rear face of each attachment member 80, and a connecting plate 83 is disposed to connect the supporting lever 82 to the rod 76 of the hydraulic cylinder 73 or 74.

The operation of drilling both the front and rear ends of flanges 102 of a wide flange steel beam 101 as shown in FIG. 9(a) by using a multiple spindle drilling machine 1 for wide flange steel beams, which is provided with the apparatus for adjusting the vertical position of drills according to the present invention, will now be described.

At first, the left and right positions of the guide roller 7 on the machine stand 2 are set according to the width of the wide flange steel beam 101, and the vertical positions of the positioning members 39 in the pair of left and right gear boxes 24 are adjusted and set according to the height of the beam 101. Sleeve liners 141 having an appropriate length are covered on the stopper pieces 49 of the upper movable member 44, the stopper pieces 40 of the positioning members 39, the stopper pieces 51 of the lower movable member 45 and the stopper pieces 30 of the lower stoppers 29. It is preferred that the height of the positioning member 39 be in agreement with the height of the web 103 of the beam 101, but when the pitch of the drilling positions in the longitudinal direction [the length between the positions 162 or between the positions 163 in FIG. 9(a)] is large, the height of the positioning member 39 is not particularly critical.

Then, the hydraulic cylinder 56 of the gear box 24 is operated to move the rod 58 downwardly, whereby the lower movable member 45 attached to the lower end of the rod 58 is brought down along the guide portion 37. When the stopper piece 52 on the lower face of the lower movable member 45 bears against the sleeve liner 141 covering the stopper piece 30 of the lower stopper 29 of the gear box 24, the hydraulic cylinder 56 per se is moved upwardly. Accordingly, the upper movable member 44 attached to the cylinder 56 is lifted up and when the sleeve liner 141 covering the stopper piece 49 on the top face of the upper movable member 44 bears against the stopper piece 28 of the upper stopper 27, both the movable members 44 and 45 are stopped [see FIG. 5(a)]. Both the upper and lower groups 151 and 152 of drills are thus maintained at the same heights as those of left and right drilling positions on the flanges 102 of the beam 101 [the positions 161 and 164 in FIG. 9(a)].

When the upper and lower movable members 44 and 45 are moved upwardly or downwardly, a pair of pinion gears 47 installed in each movable member are simultaneously rotated along a pair of racks 43 fixed to the guide member 36. Accordingly, both the front and rear ends of the respective movable members 44 and 45 are moved synchronously with each other and inclination of the drill group 151 or 152 by independent rising or lowering of one end portion is prevented.

When the preparation for the drilling operation has thus been completed, the drilling machine 1 is operated. By the operation of the drilling machine 1, the wide flange steel beam 101 is delivered by the delivery device 131 and it is stopped when the rear drilling positions of the beam 101 are in agreement with the positions of the corresponding drills 22 and 72. Then, the cylinder device 13 on the right side of the machine stand 2 is actuated to grip and fix the beam 101 between the pressing member 15 and the regulating member 12, and at the same time, the cylinder device 17 for the attachment frame 16 and supporting frame 8 is actuated to press down the web 103 of the beam 101 by the pressing member 19, whereby the beam 101 is tightly set at the drilling position. Then, the drills 72 on both the sides of the machine stand 2 are simultaneously driven and rotated through the universal joints 32 by the motor 31 and the drills are moved by the cylinder devices 25 so that the drills on both the sides are brought close to each other, whereby holes are formed at the positions 161. Simultaneously, the drills 22 above the beam 22 are moved downwardly by the cylinder device 20 while being driven and rotated by the motor 23. Accordingly, also the web 103 of the beam 101 is drilled.

After drilling of the wide flange steel beam 101 at the positions 161 has thus been completed, the beam 101 is retreated by a half pitch by the delivery device 131, and the hydraulic cylinder 56 of the gear box 24 is actuated again to move the rod 58 thereof upwardly, whereby also the lower movable member 45 is moved upwardly along the guide portion 37 of the guide member 36. When the sleeve liner 141 covering the stopper piece 51 on the top face of the lower movable member 45 bears against the stopper piece 41 on the lower face of the positioning member 39, the hydraulic cylinder 56 per se is moved downwardly. Accordingly, the upper movable member 44 begins the downward movement, and when the stopper piece 50 on the lower face of the upper movable member 44 bears against the sleeve liner 141 covering the stopper piece 40 on the top face of the positioning member 39, both the movable members 44 and 45 are stopped [see FIG. 5(b)]. At this point, the upper and lower groups 151 and 152 of drills are located at positions corresponding to the inner drilling positions of the flanges 102 of the beam 101 [positions 162 in FIG. 9(a)]. Also in this case, since the pinion gears 47 are rotated in the state engaged with the racks 43 as in the above-mentioned case, both the front and rear ends of the respective movable members 44 and 45 are moved synchronously with each other and inclination of the drill groups 151 and 152 can be prevented.

Then, the drilling machine 1 is operated again, and as in the above-mentioned case, the cylinder device 13 on the right side of the machine stand 2 and the cylinder device 17 of the attachment frame 16 and the supporting frame 8 are operated to fix the beam 101 at the drilling position. Then, the drills 72 on both the sides of the machine stand 2 are simultaneously driven and rotated and are brought close to each other, whereby drilling is performed at the positions 162 shown in FIG. 9(a).

Drilling of the rear portion of the wide flange steel beam 101 is thus completed. Subsequent drilling of the front portion of the beam 101 will now be described.

The wide flange steel beam 101 is shifted backwardly while the drill groups 151 and 152 are pierced in the beam 101 at the rear positions 162, and in the same manner as described above, the drills 72 on both the left and right sides of the beam 101 and the upper drills 22 are simultaneously driven and rotated, whereby the beam 101 is drilled at the front positions 163. Then, in the same manner as described above, the hydraulic cylinder 56 is actuated to separate the upper and lower movable members 44 and 45 from each other and drilling is carried out again. Thus, the beam 101 is drilled at the positions 164 in FIG. 9(a) and drilling of the front portion of the beam 101 is completed.

As will be apparent from the foregoing illustration, when the drilling operation is carried out according to the present invention, the drill groups 151 and 152 need not be moved in the front-rear direction and further, the wide flange steel beam 101 need not be turned, and only by moving the drill groups 151 and 152 in the vertical direction, the beam 101 can be drilled at optional positions. Furthermore, since the upper and lower movable members 44 and 45 to which the drill groups 151 and 152 are attached are moved in the vertical direction by common cylinder devices in the present invention, the operation of moving the drill groups 151 and 152 in the vertical direction can be remarkably facilitated. Moreover, since at least one pair of pinion gears 47 are mounted on each of the upper and lower movable members 44 and 45, both the front and rear ends of each of the movable members 44 and 45 are moved synchronously with each other, and therefore, inclination of the drill groups 151 and 152 can be prevented. Still further, in the present invention, since positioning members 39 are disposed to set the vertical positions of the drill groups 151 and 152 and sleeve liners 141 are disposed on the following 4 points, namely on either of the top end of the gear box 24 and the top face of the upper movable member 44, either of the lower face of the upper movable member 44 and the top face of the positioning member 39, either of the lower face of the positioning member 39 and the top face of the lower movable member 45 and on either of the lower face of the lower movable member 45 and the lower end of the gear box 24, both the upper and lower drill groups can be stopped at optional positions with respect to the vertical direction for drilling the wide flange steel beam 101.

When the number of inner drilling positions 163 is smaller by one than the number of the outer drilling positions 164 as shown in FIG. 9(b), the hydraulic cylinders 73 and 74 of the holding members 69 and 70 are actuated to project rods 76 thereof backwardly as indicated by two-dot chain lines in FIG. 8, and then, the gear boxes 24 are brought close to each other and drilling is conducted on the positions 163. In this arrangement, since the attachment members 80 are moved backwardly along the guide projections 79 through the rods 76, connecting plates 83 and supporting levers 82, when the top ends of the drills 72 of the holding members 69 and 70 bear against the flanges 102 of the wide flange steel beam 102, the connecting shafts 71 are retreated into the gear boxes 24 and the drilling operation by the drills 72 is not performed.

In the foregoing embodiment, the vertical position-adjusting movement of the positioning members 39 to the guide members 36 is performed intermittently, but this movement can be performed in a non-staged manner. Further, one of the pair of the hydraulic cylinders 56 on the top end of the gear box 24 may be omitted or these cylinders 56 may be attached to the lower end of the gear box 24.

As will readily be understood from the foregoing illustration, when the apparatus for adjusting the vertical position of drills according to the present invention is applied to a multiple spindle drilling machine, the heights of drills can be set simply and precisely and a material to be processed can be drilled at positions of an optional height.

While the present invention has been described in detail to some extent with respect to the most preferred embodiments, it is obvious that there are other modifications and variations which can be resorted to without departing from the spirit and scope of the invention, excluding, however, those modifications which are not particularly pointed out in the appended claims.

What is claimed is:

1. In an apparatus for adjusting the vertical position of drills in a multiple spindle drilling machine having:
   (a) drills attached in two lateral upper and lower rows to a gear box of the multiple spindle drilling machine, said two groups of drills being arranged so that the drills of the respective groups can be simultaneously moved in the vertical direction;
   (b) a motor for driving and rotating the two groups of drills;
   (c) moving means disposed to connect said two groups of drills so that they are moved in the vertical direction according to the height of drilling position of a material to be processed; and,
   (d) positioning means attached to the gear box to regulate the vertical movement of the drills of the respective groups within a certain range and set the vertical position thereof;

the improvement therein, wherein
- (e) the drills of the two groups are attached to a pair of upper and lower movable members respectively, which are mounted on said gear box slidably in the vertical direction, and,
- (f) said moving means includes at least one hydraulic cylinder attached to said upper movable member, said cylinder having a rod, the lower end of said rod being connected to the lower movable member.

2. An apparatus for adjusting the vertical position of drills in a multiple spindle drilling machine according to claim 1 wherein each of the drills of the two groups is attached to the upper or lower movable member so that the position thereof can be adjusted in the lengthwise direction and the pitch between every two adjacent drills can be changed.

3. An apparatus for adjusting the vertical position of drills in a multiple spindle drilling machine according to claim 1 wherein the drills of the two groups are attached to a pair of upper and lower movable members, respectively, which are mounted on the gear box slidably in the vertical direction, and said positioning means includes at least one pair of regulating members disposed on the gear box above and below said upper movable member to regulate the vertical movement of said upper movable member, a space-adjusting sleeve liner attached to the upper or lower face of each of said regulating members, at least one pair of regulating members disposed on the gear box above and below said lower movable member to regulate the vertical movement of said lower movable member, and a space-adjusting sleeve liner attached to the upper or lower face of each of said regulating members.

4. An apparatus for adjusting the vertical position of drills in a multiple spindle drilling machine according to claim 3 wherein each sleeve liner is dismountably attached to the corresponding regulating member so that it can be exchanged with other sleeve liner differing in the length.

5. An apparatus for adjusting the vertical position of drills in a multiple spindle drilling machine according to claim 1 including at least one upper regulating member for regulating the upward movement of the upper movable member, said upper regulating member having at least one upper stopper mounted on the top end of the gear box, at least one lower regulating member for regulating the downward movement of the lower movable member, said lower regulating member having at least one lower stopper mounted on the lower end of the gear box, and each of the regulating members for regulating the downward movement of the upper movable member and the regulating member for regulating the upward movement of the lower movable member including at least one positioning member with a top face and a lower face attached to the gear box between said upper and lower movable members so that the top face corresponds to the upper movable member and can be engaged therewith and the lower face of said positioning member corresponds to the lower movable member and can be engaged therewith.

6. An apparatus for adjusting the vertical position of drills in a multiple spindle drilling machine according to claim 5 wherein the positioning member is arranged so that the vertical position thereof can be adjusted on the gear box according to the height of a material to be processed.

7. An apparatus for adjusting the vertical position of drills in a multiple spindle drilling machine according to claim 1 which further comprises synchronizing means for synchronizing the movements of both the ends of each drill group with each other when the drills of each group are moved in the vertical direction, whereby both the ends of each group are prevented from inclining upwardly or downwardly, said synchronizing means including at least one pair of pinion gears disposed on both the ends of each movable member so that they can be rotated synchronously with each other and at least one pair of racks attached in the longitudinal direction to the gear box so that they are engaged with said pinion gears respectively.

8. An apparatus for adjusting the vertical position of drills in a multiple spindle drilling machine according to claim 7 wherein said pair of the pinion gears disposed on each movable member are fixed to both the ends of one shaft rotatably supported in the movable member.

* * * * *